(12) United States Patent
Butcher

(10) Patent No.: US 8,712,021 B2
(45) Date of Patent: Apr. 29, 2014

(54) RETRIEVABLE OUTGOING AUDIO MESSAGING

(76) Inventor: Christopher L. Butcher, New York, NY (US)

( * ) Notice: Subject to any disclaimer, the term of this patent is extended or adjusted under 35 U.S.C. 154(b) by 718 days.

(21) Appl. No.: 12/900,997

(22) Filed: Oct. 8, 2010

(65) Prior Publication Data

US 2012/0087483 A1   Apr. 12, 2012

(51) Int. Cl.
*H04M 1/64* (2006.01)
(52) U.S. Cl.
USPC .......................................................... 379/85
(58) Field of Classification Search
USPC ................... 379/67.1, 88.01–265; 455/412.1; 709/204
See application file for complete search history.

(56) References Cited

U.S. PATENT DOCUMENTS

| 7,280,641 | B2 * | 10/2007 | Kogure | 379/88.14 |
| 2007/0211876 | A1 * | 9/2007 | Othmer et al. | 379/201.01 |
| 2010/0172680 | A1 * | 7/2010 | Butcher | 400/76 |

* cited by examiner

*Primary Examiner* — Mohammad Islam
(74) *Attorney, Agent, or Firm* — Joseph D. Eng, Jr.; King & Spalding LLP

(57) ABSTRACT

The present invention relates generally to retaining outgoing audio messages between two voice communicating devices. In particular, the present invention relates to a system and method for using an external device that monitors all outgoing communication from a voice communicating device and stores such voice data with associate information for future retrieval. A system and method is disclosed that uses a device on the sender's side or on a remote system offered through the voice data network to monitor and record voice mails simultaneously with the receiver's side voice mail device. The recorded mail is available for access from any voice data device and also through electronic mail.

18 Claims, 4 Drawing Sheets

RETRIEVABLE OUTGOING AUDIO MESSAGING

FIELD OF THE INVENTION

The present invention relates generally to retaining outgoing audio messages between two voice data communication devices. In particular, the present invention relates to a system and method for using an external device that monitors all outgoing communication from a voice data communication device and stores such voice data with associated information for future retrieval by the sender.

BACKGROUND

Telephones have long been used to communicate between geographically remote locations. The process of communication involves using two devices capable of receiving and transmitting voice signals over a voice data capable network. The network could be any of a variety of networks in current use including fixed line telephone networks, or wireless Global System for Mobile Communications (GSM) and satellite networks.

A telephone converts analog voice signals to digital signals for transmitting over wireless or wired networks and then converts the signals back from digital to analog at the receiving end. Over the years, a concept of voice mail was introduced which allowed for voice data to be stored at a system in the receiving telephone's network without the need for manual interruption. The voice data can later be retrieved by the receiving telephone after an authentication process, if required. The sender usually has no access to the voice data on the receiver's end once the communication has been completed.

Some existing computer and VOIP based communication services like Foonz (vvwvv.foonz.com) offers a method for confirmation on voice mail delivery using VOIP services for communication. This is similar to Short Messaging Services (SMS) protocols for SMS delivery responses. However, the voice data stored on a system at the receiver's end can be deleted in error or deliberately; can be lost during transmission; can be corrupted or lost because of any failure at the stored system. Also, the sender will have to rely on the receiver to communicate as to whether the message was actually sent (or received), the contents of the message and information related to the message, such as time, date and length. This may be problematic in certain situations, such as when the sender and receiver are adverse parties in a business or legal matter.

SUMMARY OF THE INVENTION

The systems and methods described herein overcome the drawbacks and problems discussed above by recording outgoing voice data traffic by an outgoing voicemail recording device. In preferred embodiments, the outgoing voicemail recording device records the voice data and certain information related to the telephone call, non-limiting examples of which include the time and date. In preferred embodiments, the outgoing voicemail recording device marks all this information with a unique identifier and stores it digitally. This allows for dynamic storing of voice data in a continuously appending database for future retrieval.

In one embodiment, a method for retaining outgoing audio messages comprises transmitting voice data from a first device to at least one remote second device through a data network; initiating a recording of the voice data by request of the first device at an external device connected to the data network; and providing the recorded voice data to at least one requesting device when the at least one requesting device requests for the voice data and after the request device clears an authentication process at the external device.

In another embodiment, a system for retaining outgoing audio messages comprises at least one first voice data communication device for transmitting and receiving voice data over a network; at least one second voice data communication device for receiving voice data over a network; and at least one external device for securely recording voice data transmitted between the two voice data communication devices.

In yet another embodiment, a method of retaining outgoing audio messages comprises monitoring voice data traffic initiated by a voice data communication device using an external voice data recording device; receiving a initiating signal at the external voice data recording device when the voice data communication device initiates a connection to another voice data communication device through a network; building or appending a database with a unique identifier from the initiating voice data communication device, as well as the voice data and any associated information to the voice data occurred from the moment of initiation of communication to the end of communication by the initiating voice data communication device; and providing the stored database of voice data to any voice data communication device that request the voice data and associated information when the unique identifier is a match with the any voice data communication device provided unique identifier.

BRIEF DESCRIPTION OF THE DRAWINGS

The accompanying drawings constitute a part of this specification and illustrate an embodiment of the invention, and together with the specification, explain the invention.

DETAILED DESCRIPTION

Figure 1:
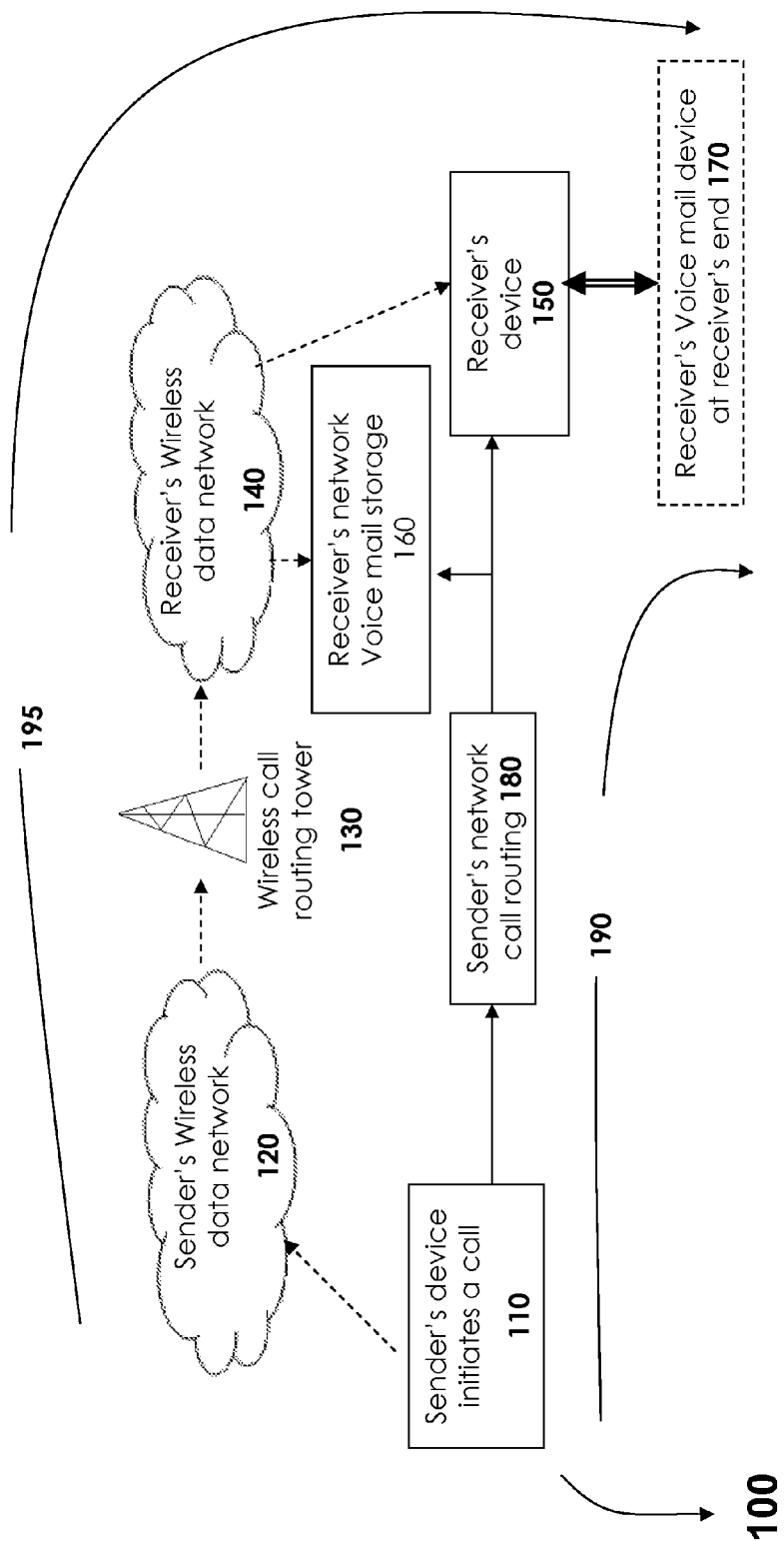
FIG. 1 shows the architecture according to the existing system.

Reference will now be made in detail to the preferred embodiments of the present invention, examples of which are illustrated in the accompanying drawings.

Voice data communication typically involves using a device to convert vocal analog signals to digital signals that would make it more efficient to transmit over long distances. Losses and reconstruction of voice signals are of higher efficiency using digital signals. The voice mail concept was introduced as an option to telephone users to be able to provide some detail on the nature of a call. This provides the receiver of the call with the discretion to attend to the call at a later stage based on the nature of the message left. Additionally, a receiver in a remote location, outside of a calling range (for a wireless phone) or not in the presence of a wired phone might still want to understand the nature of a missed call.

Eventually, voice mail progressed to provide more features to the receiver. For instance, digital voice mail provides the option of converting the voice mail into an electronic mail message format that can be sent via computers without the need for a digital voice connection. The advent of the internet further allows for voice data to be transmitted through the internet using Voice Over Internet Protocols (VOIP) for communication between phones and computers in any combination of the two. However, the sender has limited access to the process of leaving a voice message. The sender essentially transfers ownership of the voice message to the receiver when the voice mail was left.

One aspect of this invention is to provide a sent mail system for voice messages that the sender leaves on a recipient's voice mail system. The system records all voice data between the sender and the receiver's system and upon the occurrence of a triggering event. The triggering event may be manually or electronically generated. For instance, in certain embodiments, the sender manually activates the sender's sent mail system when the sender recognizes that he or she is being routed to the receiver's voicemail system. The outgoing message on the receiver's end instructs the sender to leave a voice mail and the sender proceeds to leave a voice mail, which is concurrently recorded by the sender's sent mail system.

In other embodiments, the triggering event is electronically generated. For example, the triggering event may be generated by an electronic circuit that is designed to detect changes in ring tone pattern, which would indicate that the sender is being routed to the receiver's voicemail system. For instance, the electronic circuit may be designed, using techniques known to persons of ordinary skill in art, to monitor the periodicity of ring tones, and to register a triggering event when periodic ring tones from the receiver's phone are no longer detected. When such a triggering event occurs, the sender's sent mail system activates and starts recording all communication between the sender's device and the recipient's device. In preferred embodiments, the sender's sent mail system for voicemails records the time and date of the sender's voice mail. Other data, such as the outgoing message of the receiver's voice mail system, may also be recorded with the sender's voice mail in its entirety until the communication from the sender's device is completed and the connection is terminated by the sender. In certain embodiments, only the receiver's outgoing message. Non-limiting examples of situations where only the receiver's outgoing message is recorded include when the receiver's outgoing message is to inform the caller that the voice mailbox is full or that the call is being terminated.

In certain embodiments, the sender's sent mail system may include voice recognition circuitry and associated electronics. Voice recognition circuitry and associated electronics are well known in the art. (See, e.g., U.S. Pat. Nos. 5,799,279 and 5,983,186, which are hereby incorporated by reference in their entirety.) In such embodiments, the sender's sent mail system may be programmed to recognize certain words or phrases commonly found in a receiver's outgoing message, such as "leave a message," "tone," or "beep" and to register a triggering event upon detection of such words or phrases, thereby activating the sender's sent mail system for voice mails. Such embodiments are particularly useful in cases where the receiver's voicemail picks up without being preceded by any ringing from the receiver's phone. Examples of such cases include when the sender is calling the receiver's cell phone and the receiver's cell phone is off, and also when the receiver's voicemail picks up without ringing because the receiver is talking on the other phone line.

In another embodiment, the sender's sent mail system for voice messages automatically recognizes a signal from the receiver's device on the absence of a manual interrupt to the sender's initiation for communication. For instance, the sender's sent mail system can be equipped with a circuit capable of detecting the beep or tone that commonly follows a receiver's outgoing message. Upon detection of such a beep or tone, the circuit will register a triggering event and activate the sender's sent mail system for voice mail. The sender's system then starts recording the time and date of the call initiation with the recipient's phone number and the voice mail that the sender leaves. These sent mail audio messages can be protected by the use of authentication systems known in the art.

In certain embodiments, the audio messages recorded by the sender's sent mail system for voice messages are stored digitally. Generally speaking, the stored audio messages are accessible by a variety of electronic means. For example, the stored audio messages may be accessed from devices including, but not limited to, mobile phones, wired phones, cordless phones, Voice Over Internet Protocol (VOIP phones), computers capable of making and receiving phone calls, or Personal Digital Assistants. In preferred embodiments, the audio messages are stored on a computerized system that either periodically deletes the oldest saved messages or permits the user to select audio messages for deletion.

In preferred embodiments, the voice messages are accessible only after proper authentication, which can be accomplished using techniques known in the art. In certain embodiments, the voice messages are accessible by a phone. However, the messages may also be accessible via electronic media on a computer. This invention also contemplates sending the digitally stored voice messages from sender's sent mail system to a recipient device. For instance, the digitally stored voice messages can be sent to sender's registered electronic mail address. In one particularly preferred embodiment, the sender's sent mail system for voice messages immediately sends a copy of the digitally stored voice message to the sender's registered electronic mail address immediately after it has been recorded.

System Architecture and Process

FIG. 1 shows an exiting architecture of a system 100 where a sender's device 110 communicates through a wireless network 195, through sample components 120, 130, and 140 e.g., a wireless GSM network, or through 180, a wired voice data network 190, with a receiver's device 150. The existing system contains the choice of a receiver network based voice mail storage system 160 which is commonly used in wireless devices and networks (e.g., GSM and CDMA devices and networks) or a receiver side based voice mail device 170 which is common in the case of wired connections (e.g., Voice mail systems with tape recorders). The receiver's device can be one or more, or a combination of a computer, mobile phones, PDAs, palm tops, smart phones, personal data assistant, or any other device for voice data communication.

Sender's device 110 initiates a call through either a wired network or a wireless network depending on the type of device. The call is routed and connected via towers 130 in wireless networks or through fixed routing boxes 180 for wired connections. The sender's device 110 connects the sender's wireless data network 120 through a tower to a remote, receiver's data network 140. The initiated call is transferred to the receiver's device 150 which starts to signal to the user that an incoming signal is attempting to connect. If ignored or rejected, the receiver's device 150 sends a rejected signal through the receiver's network and the receiver's network based voice mail storage system 160 informs the sender's device 110 through the sender's network 120 of the rejection and offers to record a message for the receiver at the voice mail storage system 160. Once a message has been recorded, the message stays on the voice mail storage system 160 till the receiver's device 150 initiates a call to the system for message recovery.

Alternatively, on a wired connection 190, the voice mail device 170 is on the receiver's end, connected to the receiver's device 150 either as a separate device or resident within the receiver's device. The voice mail device is automatically triggered and stores the sender's voice mail on a recording media, e.g., magnetic tapes, solid state drives and other such devices. The sender's device is outside of this process once the signal from the sender's device 110 has been terminated. The sender cannot retrieve or check the message, or receive a confirmation to the message having been delivered. Additionally, failures at the voice mail storage systems 160 and 170 can result in the message being corrupted, deleted or inaccessible.

Figure 2:
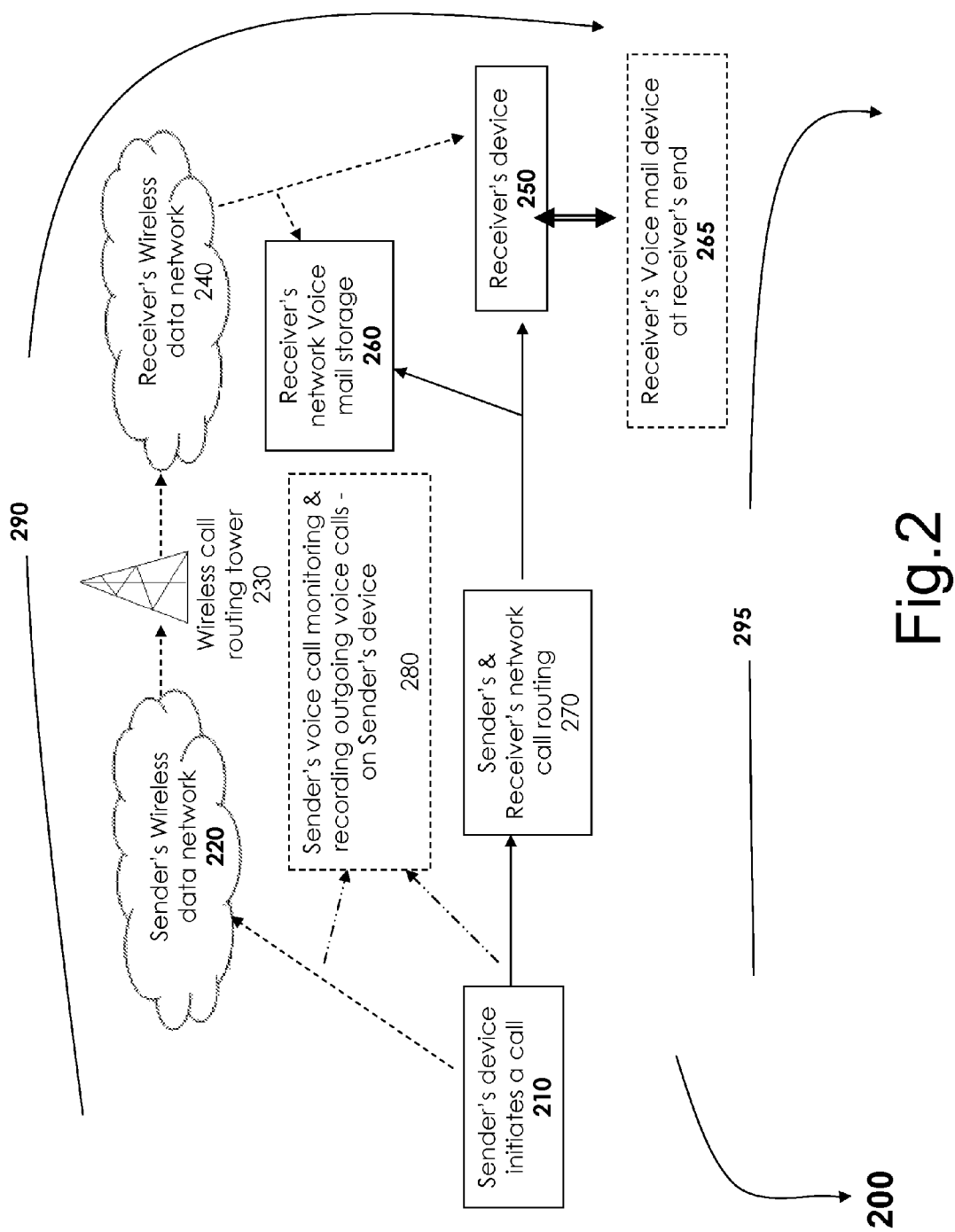
FIG. 2 shows a system architecture according to an exemplary embodiment.

FIG. 2 shows an architecture of a system 200 according to an exemplary embodiment. A client 210 communicates through a wireless network 290, through sample components 220, 230, and 240 e.g., a wireless GSM network, or through 295, a wired voice data network 270, with a receiver's device 250. The system 200 contains the choice of a receiver network based voice mail storage system 260 which is commonly used in wireless devices and networks (e.g., GSM and CDMA devices and networks) or a receiver side based voice mail device 265 which is common in the case of wired connections (e.g., Voice mail systems with tape recorders). The receiver's device can be one or more, or a combination of a computer, mobile phones, PDAs, palm tops, smart phones, personal data assistant, or any other device for voice data communication.

A Sender's voice call monitoring and recording device 280 monitors calls leaving the sender's device 210 and initiates a recording of a call when the receiver's device activates its voicemail system. The sender's device 210 may begin recording at the same time that the receiver's voice mail device 265 or 260 initiates or after the outgoing message of the receiver. The sender's voice call monitoring and recording device 280 can also be configured to record all outgoing calls made. In an embodiment, the sender's voice call monitoring and recording device 280 is located resident within the sender's device and is available only to the particular device and the device's hardware code functions as the unique identifier to be able to access the information stored within it.

When the call is initiated at the sender's device 210, a signal is sent to through either a wired network 295 or a wireless network 290. The signal informs the receiver's network 240 or 270 of the intended receiver using a unique identifier of the receiver. The identifier could be a phone number or an internet protocol (IP) address of a computer among other possible identifier options. When the receiver's device sends a reject signal back to the receiver's network, the receiver's network voice mail storage 260 initiates a rejected message signal to the sender's network 220 or 270. The sender's network is monitored by the sender's voice call monitoring and recording outgoing voice call device 280 and the device is triggered to record the unique identifier, the receiver's network rejected message signal and the voice mail that the sender's device 210 leaves.

Figure 3:
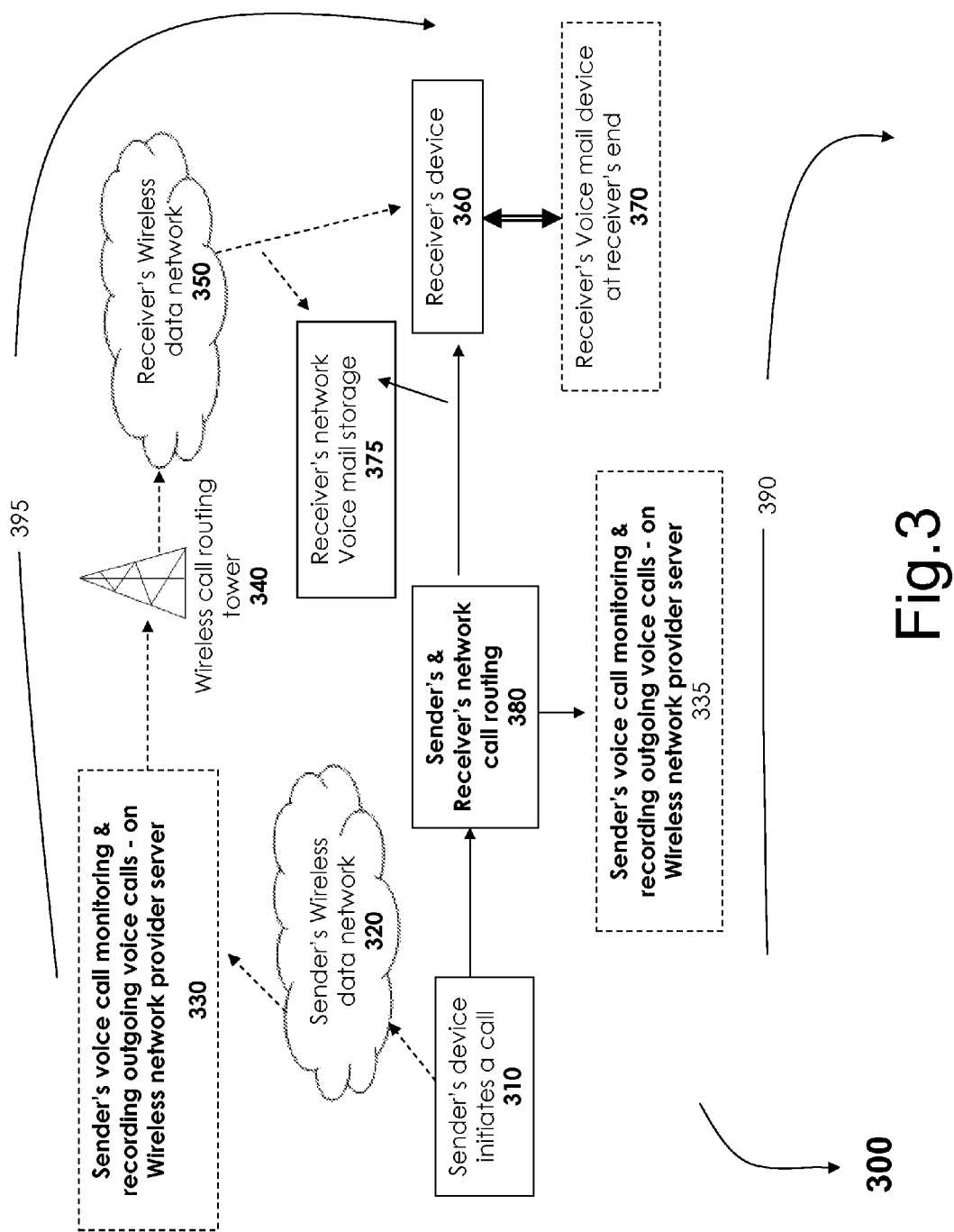
FIG. 3 shows a method for retaining outgoing audio messages according to an exemplary embodiment.

Another exemplary embodiment is shown in FIG. 3, the sender's voice call monitoring and recording device 330 or 335 is located remote to the sender's device 310. The device is a part of the voice mail system offered by the network service provider of the sender 320 or 380. The device is triggered when the voicemail system from the receiver's device 370 activates and stores all information and voice data for remote retrieval. The sent messages can be retrieved by calling a special number from any voice data device or from the sender's device alone depending on the authentication offered. Additionally, storing a device on a sender's device independent server offers the option for the network provider to combine this new data with features like electronic mail to inform recipient and sender that a voice mail has been sent. Contents of the voice mail can also be offered as an additional feature.

As an exemplary embodiment, the sender's device can be used to send a voice message to the receiver's device which can be stored at a remote system on the sender's side till the sender initiates a send command from the sender's device. Alternatively, in another embodiment, the voice message can be stored till the sender's device offers a list of recipients and can be send to an amended list of recipients. Additionally, in another embodiment, if the sender's device is not in a data network and if the sender's voice call monitoring and recording device is resident within the sender's device, the sender can record a message for delivery upon entering into a voice data network. Authentication to access the sent message is through a passcode as set by the sender.

EXAMPLES

Example 1

Figure 4:
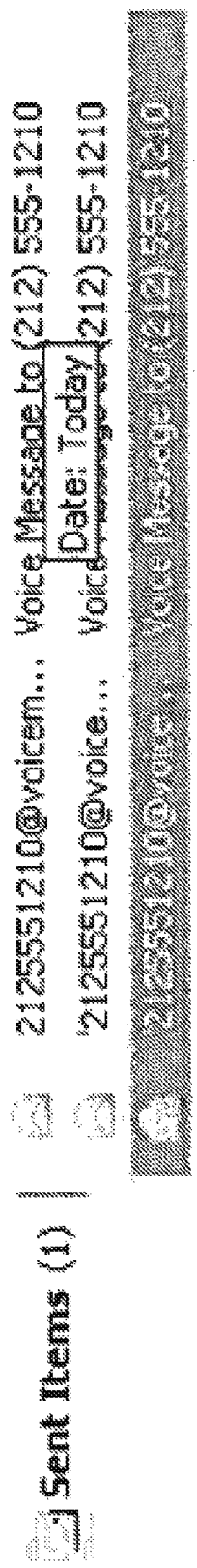
FIG. 4 shows an exemplary embodiment of the present invention with sent mail messages of the voice message left on a remote voice data device.

In this example, a sender using a mobile phone needs to call a receiver's wired phone. The sender initiates a call using the phone number of the receiver, the number and the call signal and sent through the sender's wireless network to the receiver's network and through a wired connection and is routed through a voice data router to the receiver's wired phone. The receiver is unable to pickup and on several requests, the receiver's phone triggers its wired voice mail recorder to inform the user that the receiver is not available to take the call. This is read as a signal by the sender's side voice call monitoring and recording device that detects the signal either via voice recognition, if the receiver's device fails to provide adequate signal to a rejected call (or transfers the call to an internal tape voice recorder) or via an identifier if the receiver's device responds with a 'failure-to-pickup' signal, The sender now leaves a voice message on the receiver's voice mail either on a remote system or on the receiver's device. Simultaneously, the sender's voice call monitoring and recording device records the message, either on the sender's device or a remote device on the sender's network. The remote device on the sender's network, sends an email to both the sender and the receiver, if the receiver has a registered email address on the receiver's network provider. The remote device can also send the access process of provide access to the sent voice mail by clicking on a link inside the email and being redirected to an html (hypertext markup language) internet page. An example of the email is shown in FIG. 4. The sender has no way to edit the voice mail but has access to the voice mail and can re-send it to other recipients with the initial unique identifier of the initial intended recipient or without it.

Example 2

Retrievable Outgoing Audio Messaging Activation

This example describes how a caller who is a subscriber of the service provider for retaining outgoing audio messages (R.O.A.M) can activate the message recorder, according to one embodiment of the invention. When a call is placed, the sender can press *77 on their land line phone or cellular device to initialize the message recorder. Thereafter, the activation and voice recording service would begin any time the *77 key combination is selected after being switched to the outgoing greeting or being routed directly to voicemail. The recording ends once the connection is terminated. A user can key in *77 when the call is routed to an automated answering system or answering machine.

Example

1. Place call.
2. Call is connected
3. Phone rings several times and then goes to recipient's voice messaging system.
4. Caller presses *77 on their phone and system activates.
5. Message being left is recorded on your phone service providers system under your personal account.
6. Hang up and session terminates.

The retrievable outgoing audio messaging system is programmed and designed record outgoing calls. The calls are stored and time stamped by the service provider in the subscribers individual database accounts as .WAV files. The information is maintained by the service provider and accessible by the individual subscribers. By using their personal access information, subscribers may access and retrieve their saved audio messages from an online computer account login or from the phone itself.

The embodiments described above are intended to be exemplary. One skilled in the art recognizes that numerous alternative components and embodiments that may be substituted for the particular examples described herein and still fall within the scope of the invention.

What is claimed is:

1. A method for retaining outgoing audio messages, the method comprising:
    initiating a voice call from a first device to a second device;
    transmitting data responsive to the initiated voice call from the first device to the second device through a data network;
    monitoring, by a secure device on the data network, the voice call to determine whether the voice call is accepted at a recording device corresponding to the second device;
    initiating recording of the data by the secure device, based on a request by the first device and when the voice call is accepted at the recording device of the second device, the recorded data being retained as an outgoing audio message that is stored at the secure device, and wherein the outgoing audio message is accessible by the first device; and
    optionally, providing the recorded data to at least one requesting device when the at least one requesting device requests for the recorded data and after the at least one requesting device clears an authentication process at the secure device.

2. The method according to claim 1, wherein each of the first device, the device and the at least one requesting device is a telephonic device.

3. The method according to claim 1, wherein the requesting device is a computer.

4. The method according to claim 1, wherein the data is recorded at the secure device in a digital data format.

5. The method according to claim 4, wherein the digital data format is an electronic-mail format for forwarding to the requesting device.

6. The method according to claim 1, wherein the secure device is resident within the first device.

7. The method according to claim 6, wherein the data stored in the secure device resident within the first device is not communicated to the second device unless initiated by the first device and through a communication channel that has been established over the data network with the second device in response to the initiation by the first device.

8. A system for retaining outgoing audio messages, the system comprising:
    a first voice data communication device for transmitting and receiving, over a network, data responsive to a voice call initiated by the first voice data communication device;
    a second voice data communication device for receiving the data over the network, the second voice data communication device being an intended recipient of the voice call; and
    a secure device corresponding to the first voice data communication device in the network, the secure device for monitoring if the data is accepted by a recording device corresponding to the second voice data communication device, and for securely recording the data when the data is accepted by the recording device, thereby retaining the data of the voice call as an outgoing audio message within the secure device, and wherein the outgoing audio message is accessible by the first voice data communication device.

9. The system according to claim 8, wherein the secure device is resident within the first voice data communication device.

10. The system according to claim 8, wherein the secure device is a computer.

11. A method of retaining outgoing audio messages, the method comprising:
    monitoring, by a secure device corresponding to a first voice data communication device, data initiated by a voice call from the first voice data communication device;
    receiving an initiation signal at the secure device when the voice call from the voice data communication device is accepted by a recording device corresponding to a second voice data communication device through a network; and
    building or appending a database, at the secure device in response to the initiation signal, wherein the building or appending adds to the database:
        i) a unique identifier corresponding to the voice call and
        ii) the data and information corresponding to the data, the information occurring from the moment of initiation of the voice call, wherein
        the data, the corresponding information, and the unique identifier together constituting an outgoing audio message, and wherein the outgoing audio message is accessible by the first voice data communication device.

12. The method according to claim 11, wherein each of the first and second voice data communication device is a telephone.

13. The method according to claim 11, wherein the first voice data communication device and the secure device are computers.

14. The method according to claim 11, wherein the initiation signal received at the secure device is a telephone call.

15. The method according to claim 11, wherein the secure device is resident within the first voice data communication device.

16. The method according to claim 11, wherein the unique identifier is a telephone number.

17. The method according to claim 11, wherein the unique identifier is secure passcode.

18. The method according to claim 11, wherein the associated information corresponding to the data includes the date and time of the initiation signal, length of stored data, unique identifier of the first voice data communication device.

* * * * *